United States Patent [19]
Keyworth et al.

[11] Patent Number: 5,959,756
[45] Date of Patent: Sep. 28, 1999

[54] OPTICAL DEFLECTION SWITCH

[76] Inventors: Barrie Keyworth, 2559 Flannery Drive, Ottawa, Ontario, Canada, K1V 9R5; Rajiv Iyer, 2870 Baycrest Drive, Unit 36, Ottawa, Ontario, Canada, K1V 0H1; Neil Teitelbaum, 834 Colonel By Drive, Ottawa, Ontario, Canada, K1S 5C4

[21] Appl. No.: 08/980,768

[22] Filed: Dec. 1, 1997

[51] Int. Cl.$^6$ .................................................. G01N 21/00
[52] U.S. Cl. ......................... 359/196; 359/209; 359/211; 385/16
[58] Field of Search ................................ 385/16, 17, 18, 385/19–23; 359/196, 209–211, 381

[56] References Cited

U.S. PATENT DOCUMENTS

| | | | |
|---|---|---|---|
| 4,737,003 | 4/1988 | Matsumura et al. | 385/16 |
| 5,037,169 | 8/1991 | Chun | 385/16 |
| 5,361,315 | 11/1994 | Lewis et al. | 385/16 |
| 5,589,933 | 12/1996 | Osgood et al. | 359/211 |

FOREIGN PATENT DOCUMENTS 3-48828  1/1991  Japan ....................................... 385/16

*Primary Examiner*—Rodney Bovernick
*Assistant Examiner*—Ellen E. Kang
*Attorney, Agent, or Firm*—Neil Teitelbaum & Associates

[57] ABSTRACT

A 1×n optical deflection switch has an array of k transmissive light deflectors to switch an incident light beam into one of n=$2^k$ directions. The switch can steer the light through the deflectors into one of a plurality of beam directions, by selectively individually inserting them into the light path. One embodiment uses four glass rectangular blocks as light deflectors having parallel upper and lower surfaces oriented at a predetermined oblique angle to the incident light beam. The thicknesses of the blocks follow an increasing order in proportion to successive powers of 2, i.e. t, 2t, 4t and 8t, giving a total of 16 switching positions. Another embodiment uses two arrays of 4-block switches, and selectively activates blocks from either array to provide a 1×32 switch. Yet, another embodiment uses four stepped deflectors each having two selectable sections of dissimilar thicknesses to give a total of 15 switching positions.

14 Claims, 5 Drawing Sheets

| Output Position | Block 1 | Block 2 | Block 3 | Block 4 |
|---|---|---|---|---|
| P0 | Out | Out | Out | Out |
| P1 | In | Out | Out | Out |
| P2 | Out | In | Out | Out |
| P3 | In | In | Out | Out |
| P4 | Out | Out | In | Out |
| P5 | In | Out | In | Out |
| P6 | Out | In | In | Out |
| P7 | In | In | In | Out |
| P8 | Out | Out | Out | In |
| P9 | In | Out | Out | In |
| P10 | Out | In | Out | In |
| P11 | In | In | Out | In |
| P12 | Out | Out | In | In |
| P13 | In | Out | In | In |
| P14 | Out | In | In | In |
| P15 | In | In | In | In |

Figure 2

OPTICAL DEFLECTION SWITCH

FIELD OF THE INVENTION

This invention relates to optical switches and in particular, a binary optical switch using light transmissive deflectors.

BACKGROUND OF THE INVENTION

In evolving optical communication networks, the need often arises to switch an optical signal from one path to another, be it along an optical waveguide such as an optical fibre, or in free space. Optical switching arrangements may generally be classified into two categories:

(1) moving-beam switches that redirect the optical signal path between stationary waveguides or in free space, and
(2) moving-fibre switches that physically change the location of optical fibres to be switched.

The switching mechanism of the present invention belongs to the former category.

An exemplary moving-beam switch that utilizes a moving mirror to perform the switching function is disclosed by Levinson in U.S. Pat. No. 4,580,873 which is incorporated herein by reference. Although Levinson's matrix switch appears to adequately perform its intended function of allowing light to be controllably transmitted to one of a plurality of destinations requires m×n collimating lenses coupled to input/output fibers to collimate and focus light received from input fibers and destined for output fibers respectively, it is believed too costly and somewhat complex. Aside from the cost of providing lenses, these lenses provide a collimating beam having a diameter of about 500 µm. Each of the lenses occupy a space of approximately 2 mm; thus, the minimum size, for example, of a 32 channel m×n switch is about 6 cm or more. Fabricating a large sized monolithic device is not practicable using a single monolithic silicone substrate. Furthermore, by providing a large diameter collimated beam, the size of a movable mirror deflecting the beam is required to be at least large enough to intercept the entire beam. Such large mirrors are costly, and moving a larger mirror in and out of the path of the beam requires more energy and is more difficult. Thus, it is believed that Levinson's device is not well suited to m×n applications having many input and output optical fibers.

Another switch of the former category is disclosed by Benzoni in U.S. Pat. No. 5,042,889, which relates to an activation mechanism for moving a reflective element in or out of the path of a beam of light, to allow light to be either transmitted in a first position or reflected in a second position. Although Benzoni's design may provide a simpler mechanism than that of Levinson, it provides limited functionality.

There is clearly a need for an inexpensive optical switch that will allow light to be transmitted to one of a plurality of different positions.

SUMMARY OF THE INVENTION

An object of this invention is to provide an optical deflection switch that may be configured as a 1×n switch or alternatively as an m×n switch that is easier to manufacture than many of its predecessors and which is relatively inexpensive to produce.

In accordance with the invention, there is provided, an optical deflection switch for steering an incident light beam selectively into one of a plurality of beam directions. The optical switch comprises a plurality of transmissive light deflectors disposed to receive and deflect an incident light beam. The switch further comprises activation means for individually selectively positioning the deflectors to intercept the light beam, so that the incident light beam propagates along a non-deflected direction when not intercepted by any of the deflectors, and is deflected into one of a plurality of predetermined beam directions in accordance with a particular combination of deflectors selectively positioned to intercept the light beam. Each said deflector may comprise a light transmissive block having an light entry surface and a light exit surface, at least one of the surfaces being oriented at a predetermined oblique angle to the incident light beam when being positioned to intercept the light beam. The surfaces of the blocks being positioned to intercept the light beam can be oriented substantially parallel to one another.

In one aspect of the invention, the plurality of light deflectors include an array of a predetermined number of k blocks having predetermined thicknesses that substantially follow an increasing order in proportion to successive powers of 2, so that the number of predetermined beam directions n equals up to $2^k$. For example, when k=4 light deflectors, the number of switchable beam directions n≦16.

In another aspect of the invention, the plurality of light deflectors includes a first and a second array of k and j light transmissive blocks having substantially similar refractive indices. The surfaces of the blocks from the first array are oriented substantially parallel to one another at a predetermined first oblique angle to the incident light beam when positioned to intercept the light beam. The surfaces of the blocks from the second array are oriented substantially parallel to one another at a predetermined second oblique angle to the incident light beam when positioned to intercept the light beam. The second angle is at an opposite side from the light beam to that of the first angle. The values of thickness of the blocks in each of the two arrays substantially follow an increasing order in proportion to successive powers of 2 respectively, so that the number n of predetermined beam directions equals up to $(2^k+2^j)$. For example, when j=k=4 light deflectors, the number of switchable beam directions n≦32.

BRIEF DESCRIPTION OF THE DRAWINGS

Exemplary embodiments will now be further described in conjunction with the drawings, in which:

FIG. 2 gives a table of all possible 16 switched beam directions in accordance with a particular combination of the four deflectors selectively inserted into the light beam path in the embodiment shown in FIG. 1;

DETAILED DESCRIPTION

Figure 1:
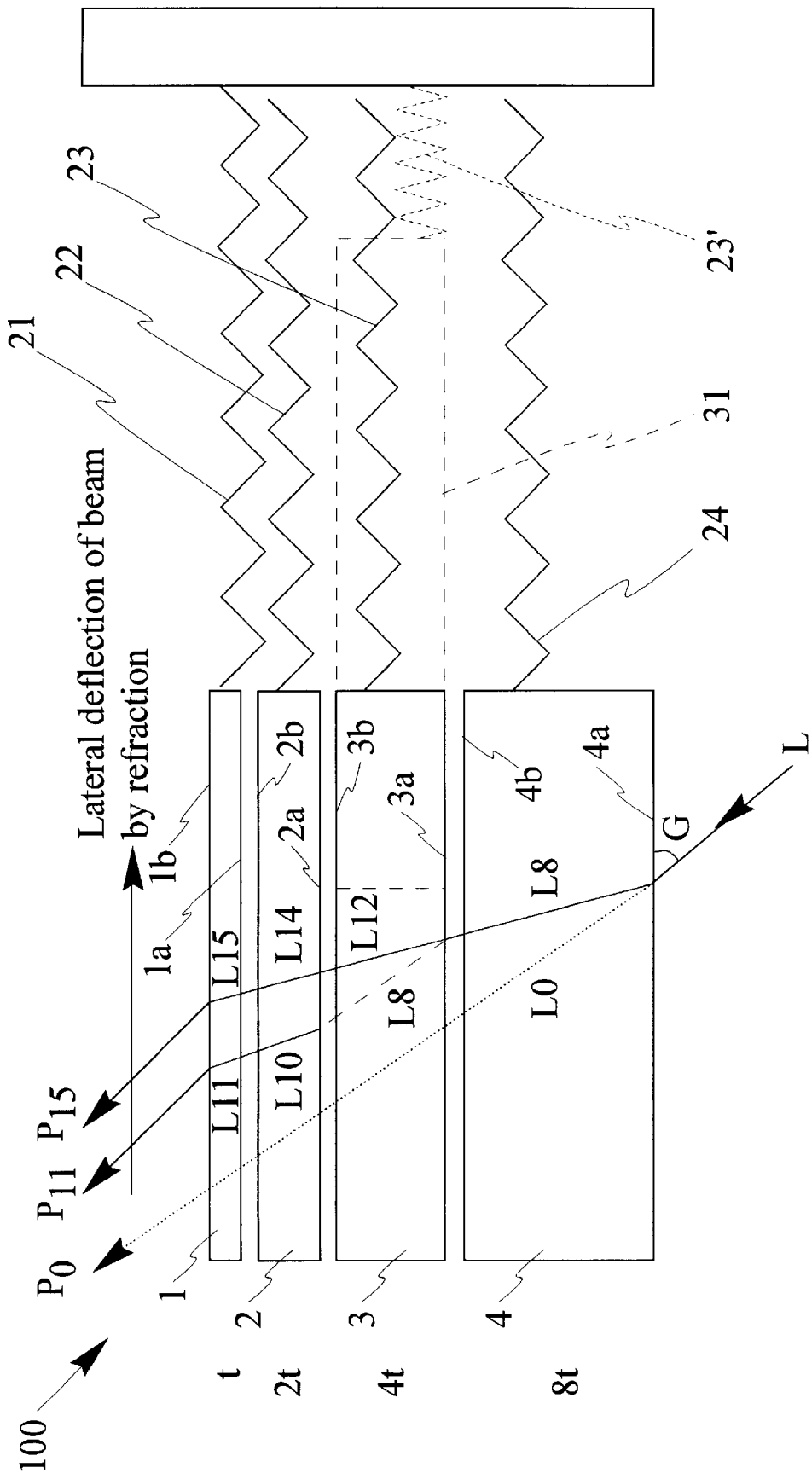
FIG. 1 is an illustrative diagram of a 1×16 optical deflection switch having four light transmissive deflectors to deflect a single incident light beam into one of 16 possible beam directions or positions in accordance with the invention.

Referring now to FIG. 1, an embodiment of the invention providing a 1×16 optical deflection switch 100 is shown; an array of four light transmissive deflectors 1–4 can be individually either retracted or positioned to intercept a light beam L and thereby deflect it to any one of the beam directions L0–L15 leading to the light output positions P0–P15 respectively, wherein only the directions along the lines L0, L8, L10, L11, L12, L14 and L15 are shown together with the light output positions P0, P11 and P15. The particular direction L0–L15, into which the light beam L is switched, is uniquely determined by the particular combination of those deflectors that are selected for intercepting the light beam L by being inserted into or retracted from its path.

The deflectors 1–4 shown in FIG. 1 are in the form of rectangular shaped blocks made of light transmissive material such as glass. Being made of the same material, the blocks have substantially similar refractive indices. Each block has a light entry surface 1a–4a and a light exit surface 1b–4b, shown in FIG. 1 as the lower and upper surfaces respectively. The lower surfaces 1a–4a and the upper surfaces 1b–4b of the blocks 1–4 are oriented substantially parallel to and adjacent one another at a predetermined first oblique angle G to the incident light beam L when positioned to intercept the light beam. The blocks 1–4 have four different thicknesses between their upper and lower surfaces that substantially follow an increasing order in proportion to successive powers of 2, namely t, 2t, 4t and 8t, so that the number of possible predetermined beam directions n equals up to $2^4$ (or 16).

Each of the four deflectors 1–4 is individually coupled to one of four activation means 21–24 respectively, shown in FIG. 1 as spring-like members merely for illustrative purposes. Of course, any suitable activation means that has a fast enough response time such as solenoids or piezoelectric actuators can be used. The activation means 21–24 are used to selectively insert none, one or more of the four deflectors 1–4 into the path of light beam L to intercept the beam and cause it to deflect in a predetermined direction along any of the lines L0–L15.

The operation of the deflection switch 100 will now be described with reference to FIG. 1. All blocks 1–4 are shown to be in their inserted position, thus intercepting an incident light beam L. In this figure the light beam L is shown propagating from the bottom of the figure directed upward in the direction of the arrow at an oblique angle G with the lower surface 4a of the block 4. The light beam first propagates through the surface 4a to be deflected sideways, demonstrating a deflection due to the refractive index difference between that of the glass block and the air adjacent to it. The beam then propagates through the block 4 along the direction of the line L8 off the upper surface 4b of block 4. It then propagates through the next adjacent blocks 3, 2 and 1 along the directions of the lines L12, L14 and L15. The beam is finally deflected off the upper surface 1b of the block 1 and is directed into the output position P15.

The blocks 1, 2, 3 and 4 shown in FIG. 1 are individually selectively movable such that they are inserted into or retracted from the light beam path. When none of the blocks 1–4 is inserted into the light beam path, the incident light beam propagates along a non-deflected direction, shown in FIG. 1 as the dotted line L0, straight into the output position P0. When, on the other hand, either block 1, 2, 3 or 4 is individually inserted into the light beam path, it effectively deflects the beam sideways relative to its non-deflected direction, by a predetermined displacement proportional to the block thickness. When more than one of the blocks 1–4 are inserted, the beam L is deflected by a displacement proportional to the cumulative thickness of all inserted blocks. As a beam of light L is launched into the deflection switch 100 at a predetermined oblique angle G, it is deflected off the air in any of the beam directions along the lines L0–L15 leading to the output positions P0–P15, depending upon which combination of individual blocks 1–4 are inserted into the light path L. By way of example, several, but not all of the possible switching paths are shown through the lines L0, L8, L10, L11, L12, L14, and L15 which steer the beam towards the output positions P0, P8, P10, P11, P12, P14, and P15 respectively. In the extreme instance, when all four blocks 1–4 are inserted as shown in FIG. 1, the light beam is deflected off the upper surface 1b of the block 1 towards the position P15 after propagating along the solid lines L8, L12, L14 and L15. In intermediate instances when only some of the blocks 1–4 are inserted, the light beam is deflected off the upper surface of uppermost inserted block 1 towards one of the positions P1–P14 in accordance with the table of FIG. 2. For example when the blocks 1, 2 and 4 are inserted while the block 3 and the activation means 23 are in their retracted positions, as shown by the dotted rectangle 3' and dotted spring-like member 23' in FIG. 1 respectively, the beam propagates along the lines L8, L10 and L11 to be deflected off the upper surface 1b of the block 1 towards the position P11.

Alternative embodiments of the invention can have any number k of light reflectors, so that the total number of possible beam directions n equals $2^k$. It is also possible to perform the same switching functions by using an embodiment wherein the transmissive light deflectors have dissimilar refractive indices, and their thicknesses do not necessarily follow an increasing order in proportion to successive powers of 2, but each deflector has a predetermined refractive index and thickness so as to deflect an incident light beam by a predetermined displacement relative to a non-deflected light beam direction, such that the displacements due to individual deflectors within an array substantially follow an increasing order in proportion to successive powers of 2, thereby allowing up to $2^k$ switchable beam directions. Furthermore, other embodiments of the present invention can use other combinations of thicknesses and refractive indices of the light deflectors than those described above, to provide different switching configurations to suit different requirements.

Yet, other embodiments of the present invention can utilise, in lieu of the moveable light deflecting blocks 1–4 shown in FIG. 1, a sequence of light transmissive regions having modifiable light deflecting properties. The regions can be occupied by such light transmissive material as electro-optical polymers, liquid crystals, or piezoelectric materials. The refractive index of such materials can be selectively modified by activation means that apply electric, magnetic fields or mechanical pressure thereto. The incident light beam is then deflected into one of a plurality of predetermined beam directions in accordance with a particular pattern of light deflecting properties of the light transmissive regions, selectively modified by the activation means.

Figure 3:
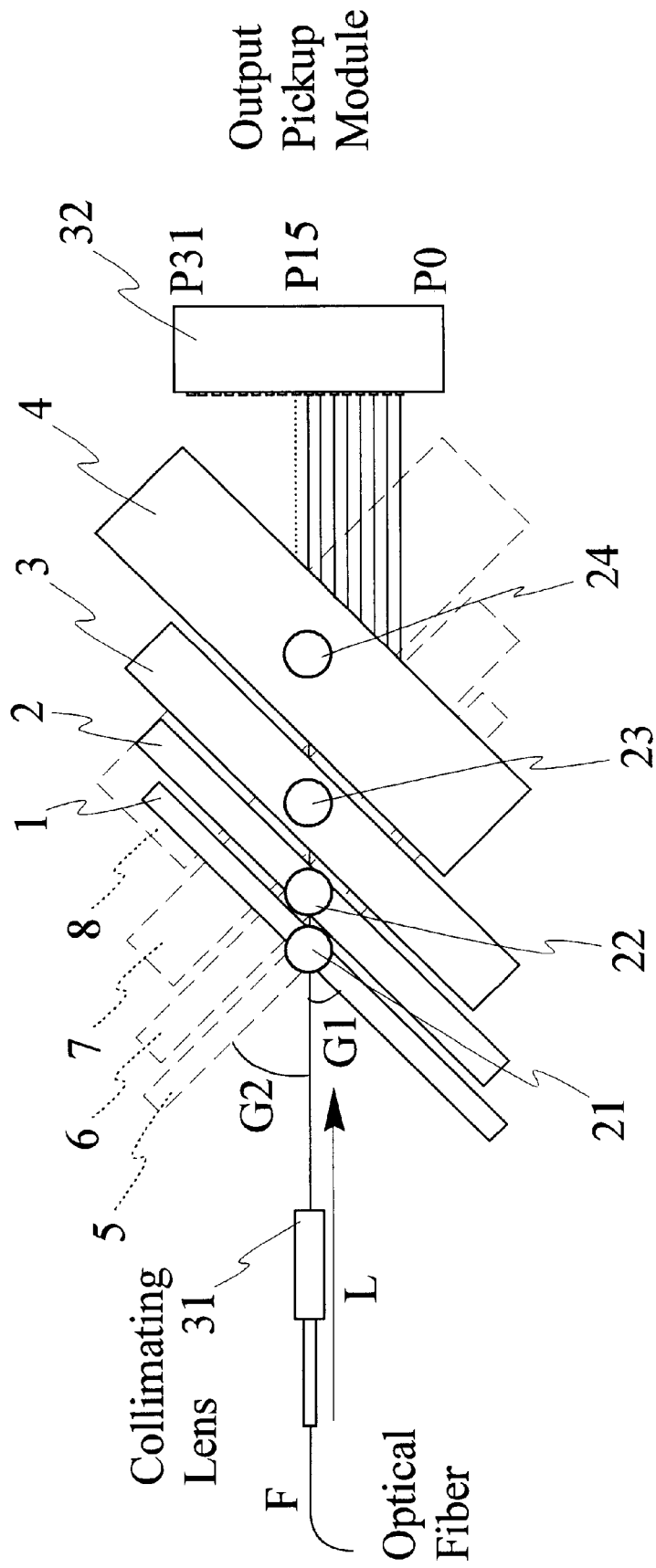
FIG. 3 is a detailed top view of a preferred embodiment illustrating an aspect of the invention having two arrays of four block light deflectors shown in FIG. 1 to provide for a 1×32 optical switching operation.
Figure 4:
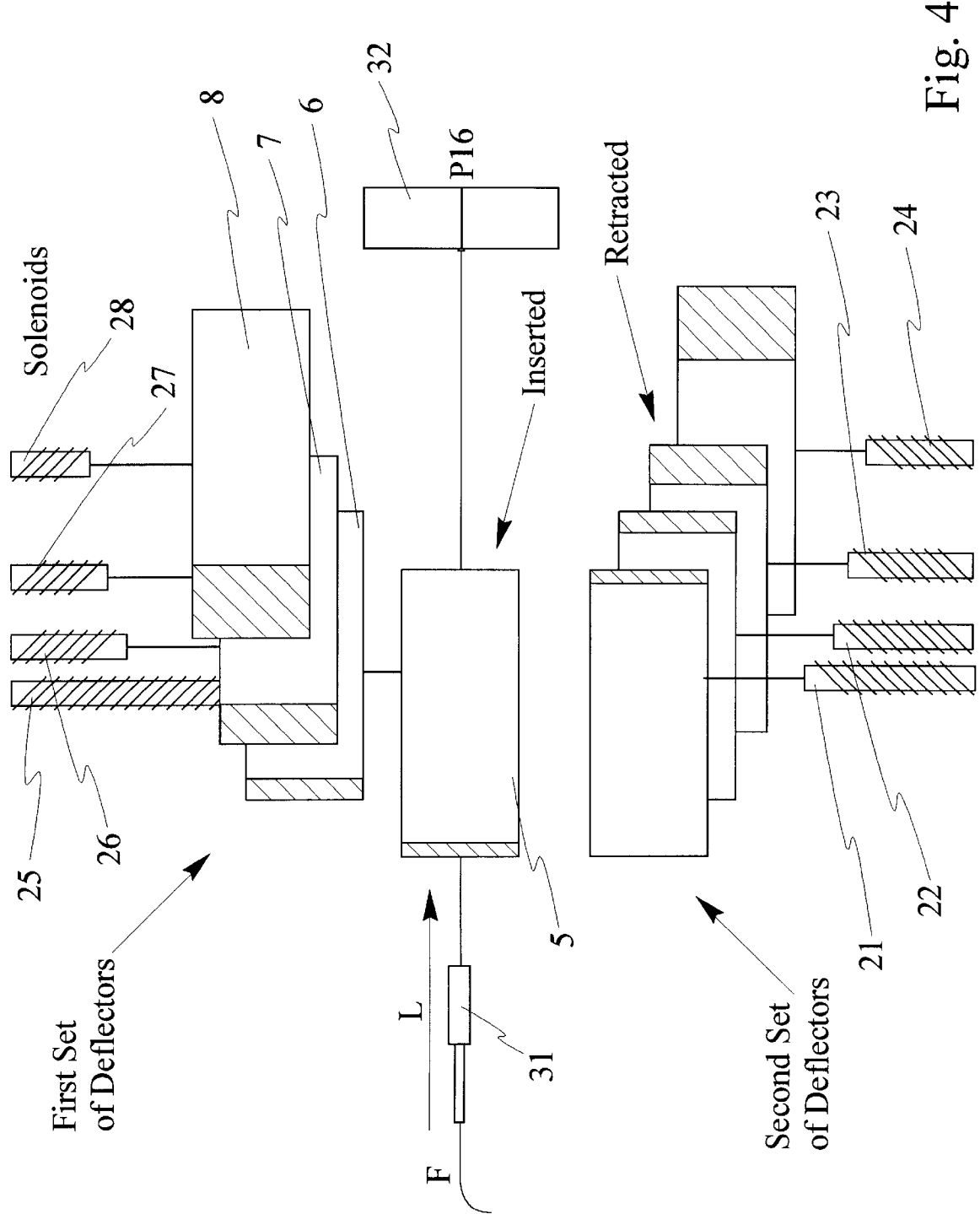
FIG. 4 is a side view of the embodiment shown in FIG. 3 to illustrate the relative position of the light deflectors from the two arrays of blocks, when being inserted into or retracted out of the light beam path; and, FIG. 5 is a side view of an alternative embodiment of the switch shown in FIG. 1 wherein stepped light transmissive deflectors each having two selectable sections of dissimilar thicknesses are used.

Referring now to FIGS. 3 and 4, an alternative embodiment is illustrated in greater detail which has a first array 1–4 and a second array 5–8 each having four light deflectors in the form of rectangular blocks made of light transmissive material such as glass, to provide for a 1×32 optical switch 100. Each array of blocks operates in a substantially similar fashion to the embodiment of FIG. 1 as explained above. For any switching position, blocks from only one of said arrays, 1–4 or 5–8, are individually selectively inserted into the path of light beam L. For example, FIG. 4 shows only the block 5 being inserted thereinto. As the block 5 has the smallest thickness t from the second array, the beam L is effectively deflected towards the output position P16 which represents the first position next to the last position P15 corresponding to the first array of blocks 1–4.

As in the embodiment of FIG. 1, the upper surfaces 1b–4b and the lower surfaces 1a–4a of the blocks from the first array 1–4 shown in FIG. 3, are oriented substantially parallel to one another and at a predetermined first oblique angle G1 to the incident light beam L when inserted into the light path. On the other hand, the surfaces of the blocks from the second array 5–8 are oriented substantially parallel to one another and at a predetermined second oblique angle G2 to the incident light beam when inserted into the light path, where G2 is at an opposite side from the light beam L to that of G1. Similar to the embodiment of FIG. 1, the thicknesses of the blocks in each of the two arrays 1–4 and 5–8, shown in FIGS. 3 and 4 substantially follow an increasing order in proportion to successive powers of 2, i.e. t, 2t, 4t and 8t.

The source of incident light beam L in FIGS. 3 and 4 is shown to be an optical fibre F on the left hand side of the switch 100. A collimating lens 31 is positioned between the light source and the light deflectors 1–8 to obtain a sufficiently narrow beam for proper switching operation. In this embodiment, deflected light is directed to an output pickup module 32 having thirty-two output positions P0–P31. In FIGS. 3 and 4, the activation means 21–28, individually acting on blocks 1–8 respectively, are shown in the form of solenoids merely for the purpose of illustration. Other suitable activation means such as piezoelectric actuators can also be used.

Based on the same principles explained above with respect to the embodiment of FIG. 1, each array of blocks, shown in FIGS. 3 and 4, will provide up to sixteen possible beam directions leading to positions P0–P15 and P16–P31 respectively, at the output module 32. Alternative embodiments of the invention can have any numbers k and j of light reflectors in the first and second arrays respectively, so that the number of beam directions n at the switch output 32 equals up to $(2^k + 2^j)$.

Figure 5:
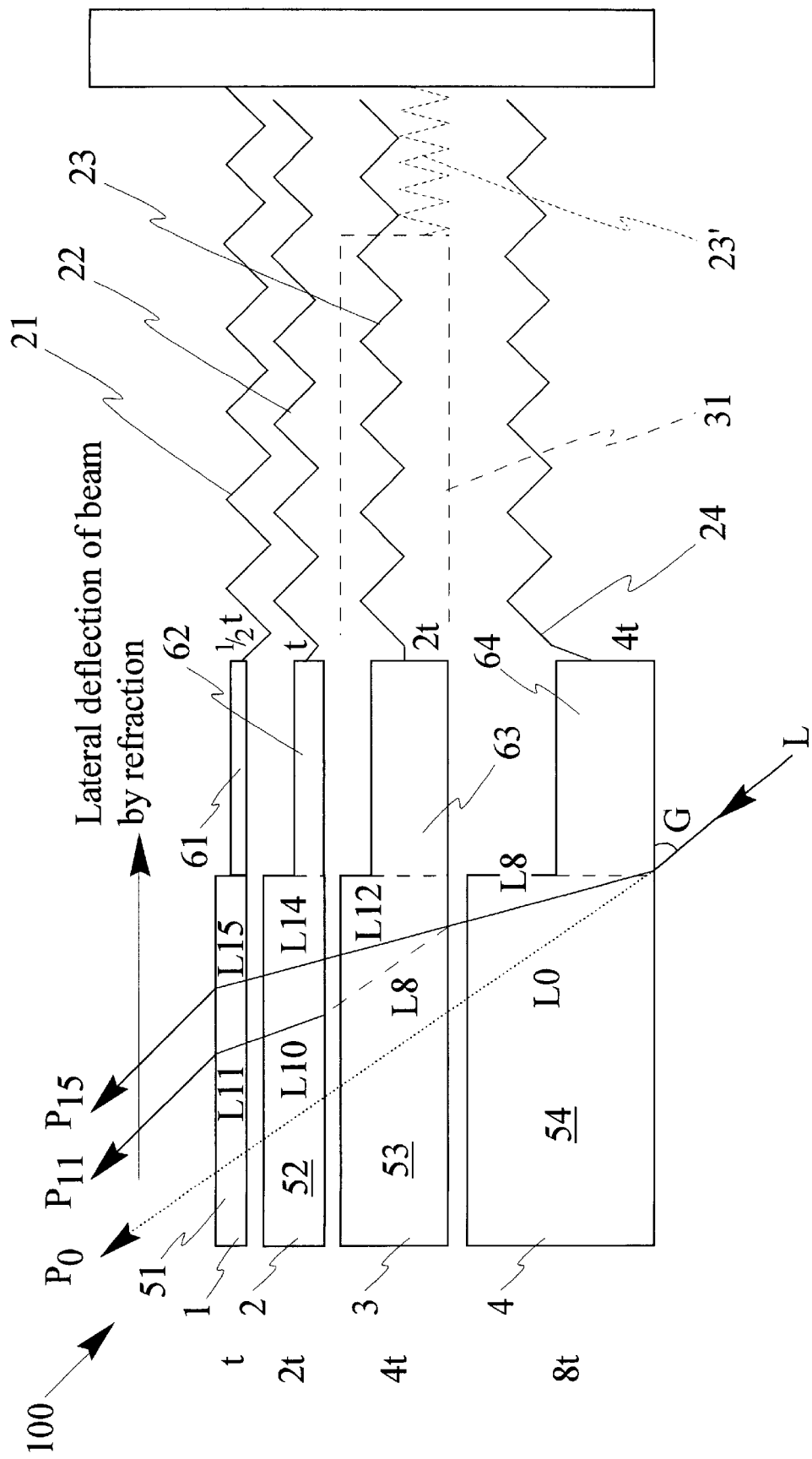

Referring further to FIG. 5, an alternative embodiment of the switch shown in FIG. 1 is illustrated wherein stepped light transmissive deflectors 1–4 are used. Each deflector has two selectable block sections of dissimilar predetermined thicknesses. In the embodiment shown, the deflector 1 has one section 51 of thickness t and another section ½t. Similarly the deflector 2 has two sections 52 and 62 of thicknesses 2t and t respectively, the deflector 3 has two sections 53 and 63 of thicknesses 4t and 2t respectively, and the deflector 4 has two sections 54 and 64 of thicknesses 8t and 4t respectively.

As in the embodiments of FIGS. 1 and 3, each deflector 1–4 shown in FIG. 5 is coupled to an activation means 21–24 respectively, shown as spring-like members merely for illustrative purposes. Under this arrangement, three alternative positions are possible for each deflector 1–4 when activated by the corresponding activation means 21–24; i.e. being retracted out of the path of the light beam L, and having either of its two block section inserted into the light beam path. It is clear for a person skilled in the art to see that the number of all possible switching positions equals the number of all possible combinations of cumulative thicknesses of the block section inserted into the light beam path. Accordingly, there is a total 31 possible switching positions in the specific embodiment shown, which correspond to all thickness combinations ranging from 0 to 15½t in increments of ½t.

It is not essential, however, that all the deflectors 1–4 in FIG. 5 have more than one block section. For example, if the deflector 1 has two block sections 51 and 61 of thicknesses t and ½t respectively, while the other deflectors 2–4 have one section each, of thicknesses 2t–8t respectively, then it is possible to have a total of 24 possible switching positions, which correspond to all thickness combinations 0t, ½t, t, 2t, 2½t, 3t, 4t, 4½t, 5t, 6t, 6½t, 7t, 8t, 8½t, 9t, 10t, 10½t, 11t, 12t, 12½t, 13t, 14t, 14½t and 15t. Other alternative embodiments to that shown in FIG. 5 can have more than two block sections within any of the deflectors 1–4, to obtain larger numbers of possible switching positions.

Each of the alternative embodiments of the optical switch described heretofore in accordance with this invention, can be used as a 1×n switch, or alternatively, can be grouped with m-1 several other similar switches to provide an m×n optical switch.

Of course, numerous variations and adaptations may be made to the particular embodiments of the invention described above, without departing from the spirit and scope of the invention, which is defined in the claims.

What is claimed is:

1. An optical deflection switch for steering an incident light beam selectively into one of a plurality of beam directions, said optical switch comprising:

a plurality of movable transmissive light deflectors disposed to receive and deflect the incident light beam into a plurality of switching positions;

activation means for individually selectively moving and positioning at least some of the deflectors to intercept the light beam in a first mode of operation, and for individually moving at least some of the deflectors out of the path of the beam in a second mode of operation such that the incident light beam is deflected to one of a plurality of predetermined beam directions in accordance with a particular combination of deflectors selectively positioned to intercept the light beam, the activation means for switching the incident light beam into a plurality of different switching positions, some of the different switching positions corresponding to the incident light beam serially propagating through different combinations of the movable transmissive light deflectors, and wherein some switching positions correspond to the incident light beam passing through at least two movable transmissive light deflectors simultaneously in the path of the beam.

2. An optical deflection switch as claimed in claim 1, wherein each said transmissive light deflector comprises a light transmissive block having a light entry surface and a light exit surface, both surfaces being substantially parallel to one another.

3. An optical deflection switch as claimed in claim 2, wherein the surfaces of the light transmissive blocks are oriented substantially parallel to one another when being positioned to intercept the light beam.

4. An optical deflection switch as claimed in claim 3, wherein the surfaces are oriented at a predetermined oblique angle to the incident light beam when predetermined switching state, a plurality of the light transmissive deflectors are simultaneously in the path of the incident beam of light.

5. An optical deflection switch as claimed in claim 4, wherein the plurality of transmissive light deflectors includes an array of a predetermined number of k light transmissive blocks having substantially similar refractive indices and having predetermined thicknesses that substantially follow an increasing order in proportion to successive powers of 2, so that the number of predetermined beam directions n equals up to $2^k$.

6. An optical deflection switch as claimed in claim 5, wherein k=4 and n≦16.

7. An optical deflection switch as claimed in claim 4, wherein at least one of said light transmissive blocks comprises a plurality of block sections having dissimilar predetermined thicknesses, said sections for being individually selectively positioned by the activation means to intercept the light path.

8. An optical switch as claimed in claim 7, wherein j=4, k=4 and n≦32.

9. An optical deflection switch as claimed in claim 4, wherein at least one of said blocks comprises a plurality of block sections having dissimilar predetermined thicknesses, said sections for being individually selectively positioned by the activation means to intercept the light path.

10. An optical deflection switch as claimed in claim 4, wherein the activation means comprise a plurality of solenoids each coupled to one of said plurality of transmissive light deflectors.

11. An optical deflection switch as claimed in claim 2, wherein the plurality of transmissive light deflectors includes a first and a second array of k and j light transmissive blocks having substantially similar refractive indices, the surfaces of the blocks from the first array are oriented substantially parallel to one another at a predetermined first oblique angle to the incident light beam when positioned to intercept the light beam, and have predetermined thicknesses that substantially follow an increasing order in proportion to successive powers of 2 respectively, and wherein the surfaces of the blocks from the second array are oriented substantially parallel to one another at a predetermined second oblique angle to the incident light beam when positioned to intercept the light beam, and have predetermined thicknesses that substantially follow an increasing order in proportion to successive powers of 2 respectively, so that the plurality n of predetermined beam directions equals up to $(2^k+2^j)$ when a combination of blocks from either the first array or the second array are selectively positioned to intercept the light beam.

12. An optical deflection switch as claimed in claims 5 or 11, further comprising a collimating lens for being positioned between the light beam and the light deflectors.

13. An optical deflection switch as claimed in claim 1, wherein the plurality of transmissive light deflectors includes a array of a predetermined number of k deflectors, each for deflecting the incident light beam by a predetermined displacement relative to a non-deflected light beam direction, such that said displacements substantially follow an increasing order in proportion to successive powers of 2, so that the number of predetermined beam directions n equals up to $2^k$.

14. A method of steering an incident light beam selectively into one of a plurality of beam directions, comprising the steps of:

directing the incident beam into a plurality of movable transmissive light deflectors disposed to receive and deflect the incident light beam into a plurality of switching positions;

individually selectively moving and positioning at least some of the deflectors to intercept the light beam in a first mode of operation, and individually moving at least some of the deflectors out of the path of the beam in a second mode of operation such that the incident light beam is deflected to one of a plurality of predetermined beam directions in accordance with a particular combination of deflectors selectively positioned to intercept the light beam, the incident beam being selectively switched into a plurality of different switching positions, some of the different switching positions corresponding to the incident light beam serially propagating through different combinations of the movable transmissive light deflectors, and wherein some switching positions correspond to the incident light beam passing through at least two movable transmissive light deflectors simultaneously in the path of the beam.

\* \* \* \* \*

UNITED STATES PATENT AND TRADEMARK OFFICE
CERTIFICATE OF CORRECTION

PATENT NO. : 5,959,756
DATED : September 28, 1999
INVENTOR(S) : Keyworth et al.

It is certified that error appears in the above-identified patent and that said Letters Patent is hereby corrected as shown below:

On the Title page, item [56], References Cited, please add:

Blonder     4,932,745     June 12, 1990     Class 350     Subclass 96.20

Col. 6, line 55, claim 4 should read --

An optical deflection switch as claimed in claim 3, wherein the surfaces are oriented at a predetermined oblique angle to the incident light beam when positioned to intercept the light beam[.] and wherein in operation, to select a predetermined switching state, a plurality of the light transmissive deflectors are simultaneously in the path of the incident beam of light. --

Signed and Sealed this

Eighteenth Day of April, 2000

Attest:

Q. TODD DICKINSON

*Attesting Officer*     *Director of Patents and Trademarks*